United States Patent
Obara et al.

(10) Patent No.: US 7,437,577 B2
(45) Date of Patent: Oct. 14, 2008

(54) INFORMATION PROCESSING APPARATUS AND POWER CONSUMPTION CONTROL METHOD

(75) Inventors: Mitsuhiko Obara, Fussa (JP); Takashi Sakurai, Ome (JP); Makoto Midorikawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 668 days.

(21) Appl. No.: 11/156,443

(22) Filed: Jun. 20, 2005

(65) Prior Publication Data

US 2006/0020891 A1    Jan. 26, 2006

(30) Foreign Application Priority Data

Jul. 21, 2004    (JP)    ............... 2004-213299

(51) Int. Cl.
*G06F 1/00*    (2006.01)
*G06F 1/26*    (2006.01)
(52) U.S. Cl. ........................... 713/300; 713/320
(58) Field of Classification Search .................. 713/300
See application file for complete search history.

(56) References Cited

U.S. PATENT DOCUMENTS 6,757,028 B2 *    6/2004    Yamamoto .................. 348/731

2002/0163590 A1*    11/2002    Tung ............................ 348/554
2004/0019813 A1    1/2004    Kobayahi et al.
2004/0170398 A1*    9/2004    Nishigaki .................... 386/125
2004/0181701 A1*    9/2004    Okumura .................... 713/300

FOREIGN PATENT DOCUMENTS

| JP | 8-298636 | 11/1996 |
|---|---|---|
| JP | 10-108115 | 4/1998 |
| JP | 11-234582 | 8/1999 |
| JP | 2002-354376 | 12/2002 |
| JP | 2004-56178 | 2/2004 |

* cited by examiner

*Primary Examiner*—Rehana Perveen
*Assistant Examiner*—Stefan Stoynov
(74) *Attorney, Agent, or Firm*—Blakely, Sokoloff, Taylor & Zafman LLP

(57) ABSTRACT

According to one embodiment of the invention, an information processing apparatus comprises a receiving unit to receive video data, a driver and a control circuit. The driver is configured to detect a start and an end of a video reproduction program that reproduces the video data received by the receiving unit. In communication with the driver, the control circuit is configured to change a state of the receiving unit from a power-down state to an operative state when the start of the video reproduction program is detected, and to change the state of the receiving unit from the operative state to the power-down state when the end of the video reproduction program is detected.

19 Claims, 6 Drawing Sheets

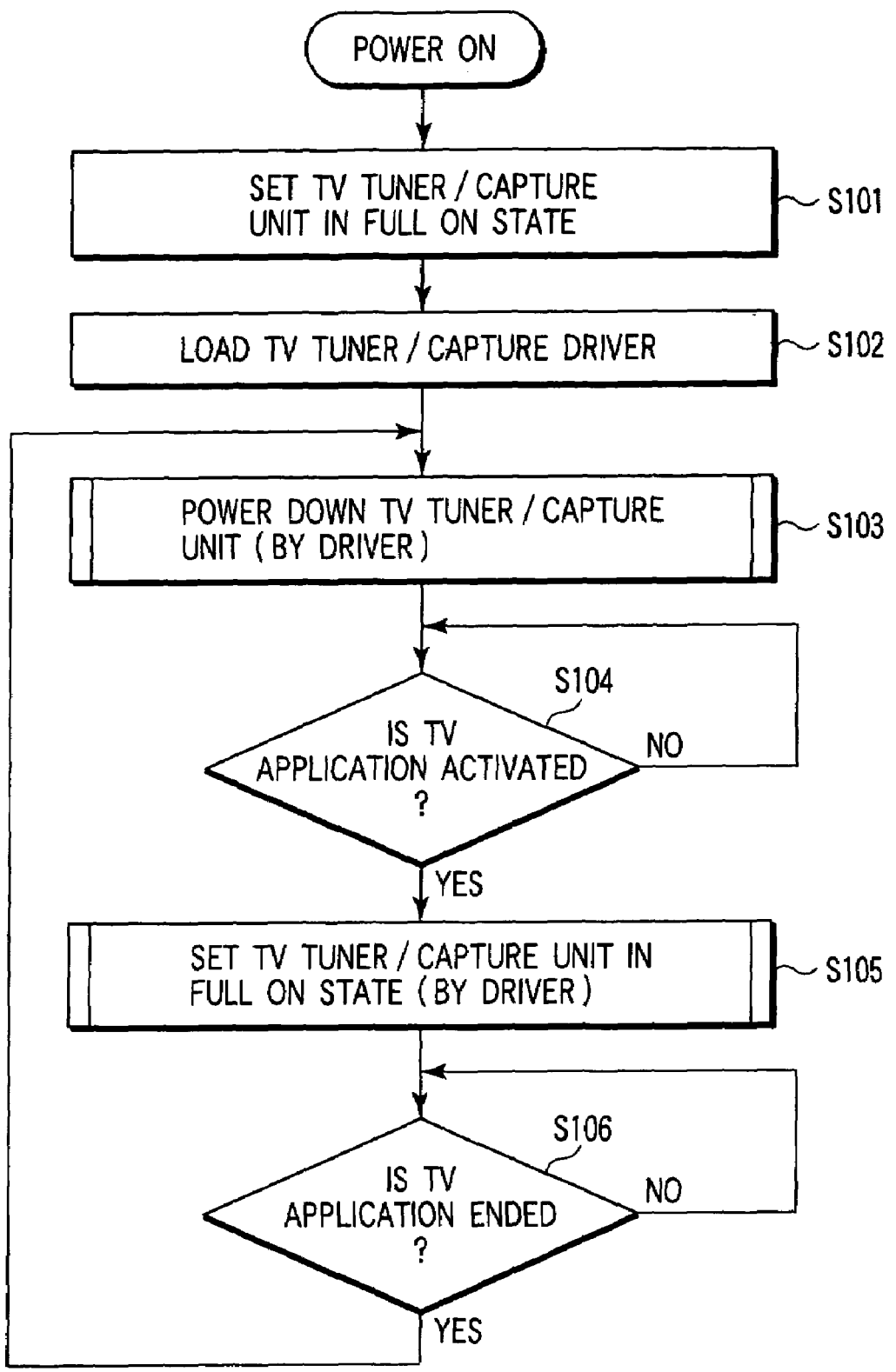
F I G. 4

INFORMATION PROCESSING APPARATUS AND POWER CONSUMPTION CONTROL METHOD

CROSS-REFERENCE TO RELATED APPLICATIONS

This application is based upon and claims the benefit of priority from the prior Japanese Patent Application No. 2004-213299, filed Jul. 21, 2004, the entire contents of which are incorporated herein by reference.

BACKGROUND

1. Field

Embodiments of the present invention relate to an information processing apparatus such as a personal computer, and to a power consumption control method for use in the apparatus.

2. Description of the Related Art

In recent years, various battery-powerable mobile personal computers, such as notebook personal computers, have been developed. In addition, a mobile personal computer, which incorporates a receiving device such as a TV tuner that receives video signals from outside, has recently been developed.

In the mobile personal computer incorporating the receiving device, however, the power consumption increases by an amount corresponding to the power that is consumed by the receiving device. Consequently, the battery-powerable time period of the personal computer decreases.

Jpn. Pat. Appln. KOKAI Publication No. 11-234582 discloses a technique for reducing power consumption of a TV tuner. In the tuner device disclosed in KOKAI 11-234582, when an antenna is not connected to a tuner circuit, the tuner device is powered off.

In general, however, a personal computer executes various application programs, other than an application program for TV viewing/listening. Even when the antenna is connected to the personal computer, the user is not necessarily viewing/listening to the TV. In this case, power is needlessly consumed by the TV tuner device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart that illustrates an example of the procedure of a power management process that is executed by the computer shown in FIG. 1;

DETAILED DESCRIPTION

Various embodiments of the present invention will now be described with reference to the accompanying drawings.

Figure 1:
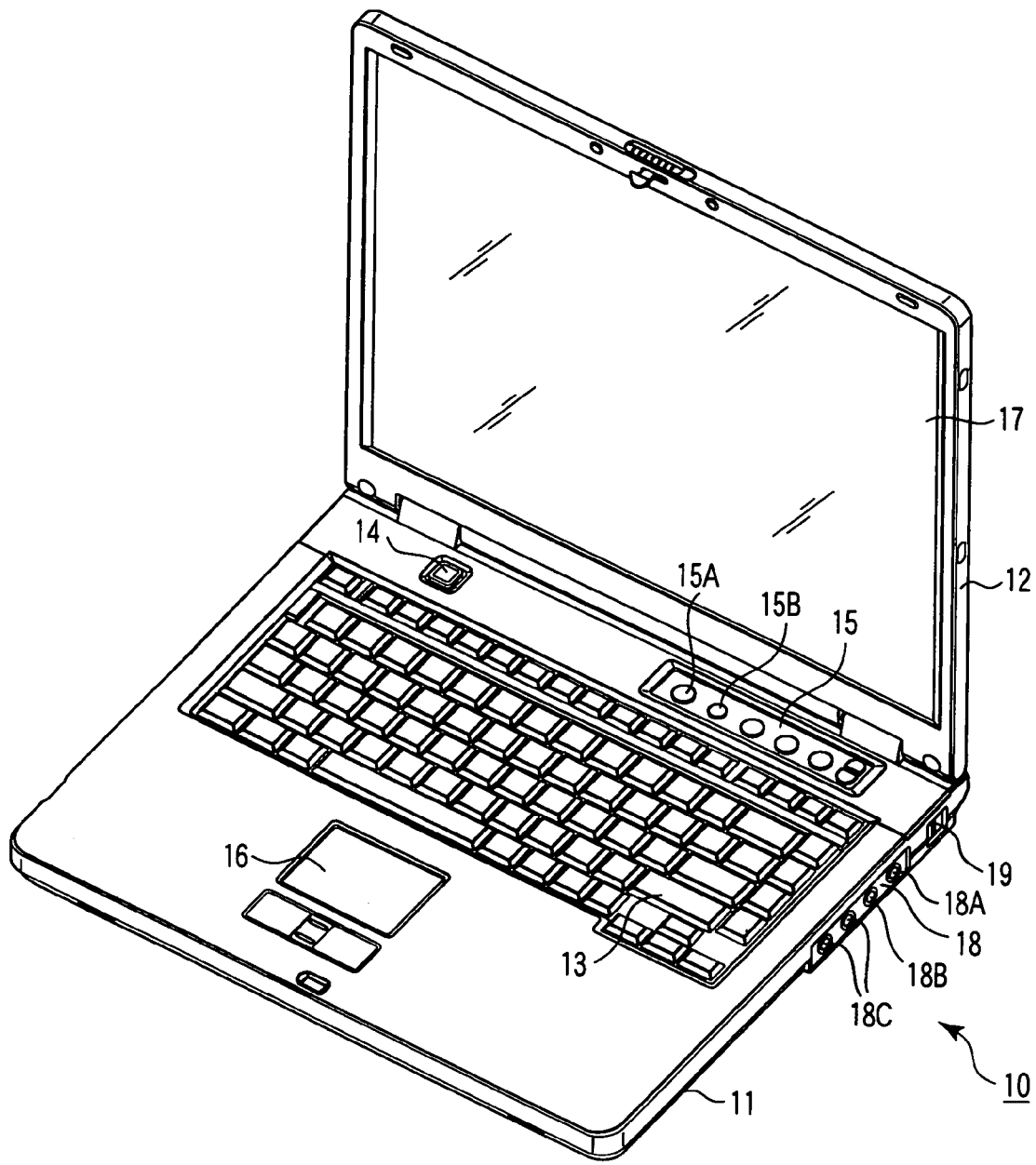
FIG. 1 is a perspective view that shows the external appearance of a computer according to an embodiment of the present invention.
Figure 2:
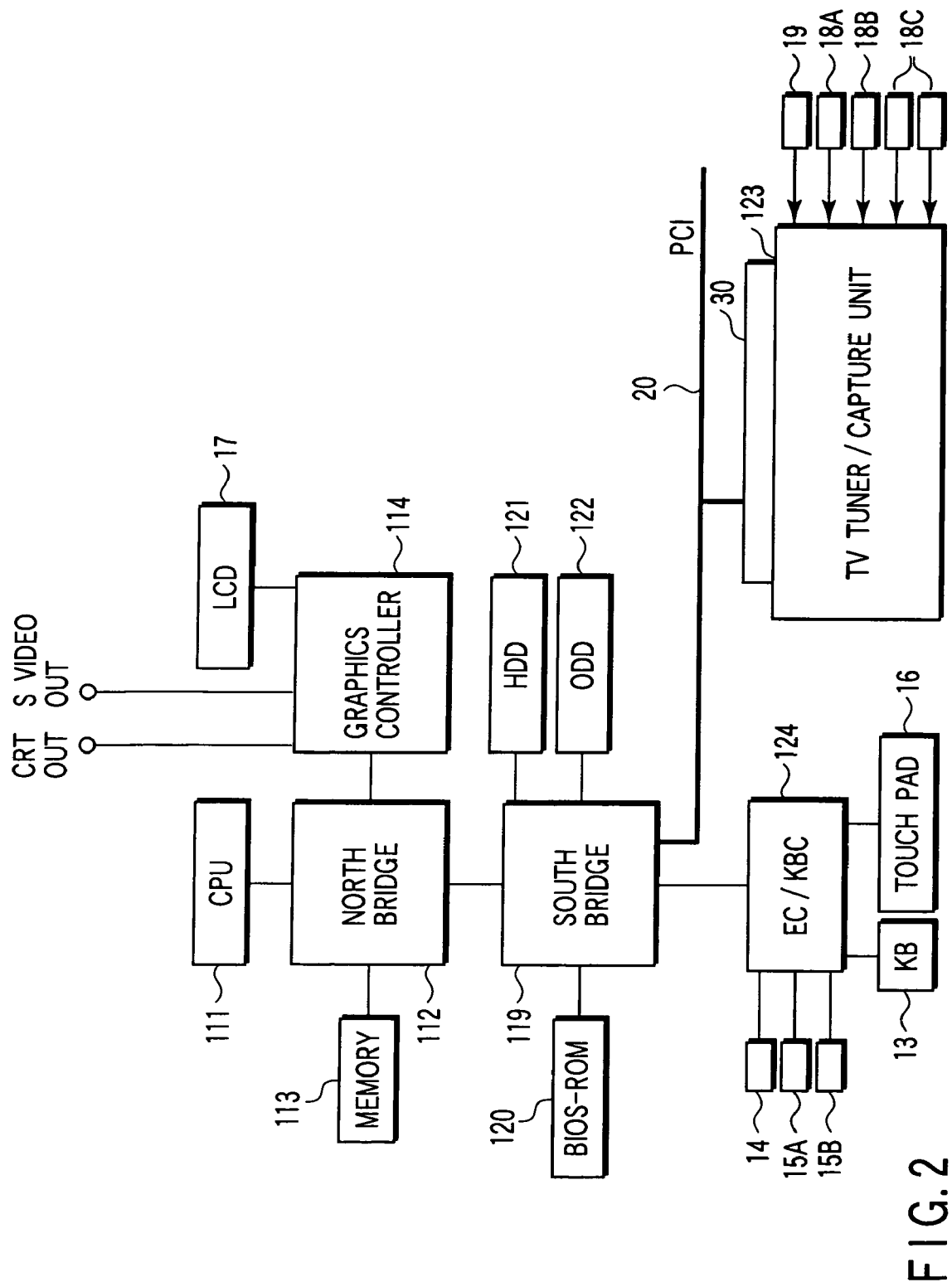
FIG. 2 is a block diagram that shows an exemplary system configuration of the computer shown in FIG. 1.

Referring to FIG. 1 and FIG. 2, the exemplary structure of an information processing apparatus according to the embodiment of the invention is described. The information processing apparatus is realized, for example, as a notebook personal computer 10. Of course, other embodiments of an information processing apparatus may include, but are not limited or restricted to a personal digital assistant (PDA) or any type of portable computer.

FIG. 1 shows the front side of the notebook personal computer 10 in the state in which a display unit is placed in an Open position. The computer 10 comprises a computer main body 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is rotatable between an open position and a closed position. The computer main body 11 has a box-shaped casing. A keyboard 13, a power button 14 for powering on/off the computer 10, an input operation panel 15 and a touch pad 16 are disposed on the top surface of the computer main body 11.

The input operation panel 15 is an input device that inputs an event corresponding to a pressed button. According to one embodiment of the invention, the input operation panel 15 has a plurality of buttons for activating a plurality of functions, such as a TV activation button 15A and a channel switch button 15B. The TV activation button 15A is a button for reproducing TV broadcast program data. When the TV activation button 15A is pressed by the user, a TV application program is automatically started. The TV application program is a video reproduction program for viewing/listening and recording TV broadcast program data. The channel switch button 15B is a button for selecting a channel of TV broadcast program data that is to be viewed/listened to or recorded. Each time the channel switch button 15B is pressed by the user, the channel of TV broadcast program data that is to be viewed/listened to or recorded is changed in succession.

The side face of the computer main body 11 is equipped with an AV (Audio-Video) connector set 18 and a TV antenna connector 19. A TV antenna cable is connected to the TV antenna connector 19. The AV (Audio-Video) connector set 18 is a set of connectors for receiving AV data from an external source (e.g., a DVD player, cable service provider, etc.). The AV connector set 18 includes a composite video input connector 18A, an S-video input connector 18B, and two audio input connectors (audio-L, audio-R) 18C.

FIG. 2 shows an exemplary system configuration of the computer 10.

The computer 10, as shown in FIG. 2, comprises a CPU 111, a north bridge 112, a main memory 113, a graphics controller 114, a south bridge 119, a BIOS-ROM 120, a hard disk drive (HDD) 121, an optical disk drive (ODD) 122, a TV tuner/capture unit 123, and an embedded controller/keyboard controller IC (EC/KBC) 124.

The CPU 111 is a processor that is provided for controlling the operation of the computer 10. The CPU 111 executes an operating system (OS) and various application programs, which are loaded in the main memory 113 from the hard disk drive (HDD) 121. The OS includes a windows-based system for displaying a plurality of windows on the display screen.

Video data (e.g. TV broadcast program data, or video data that is input from an external device) is normally displayed within a window that corresponds to the TV application program. For example, the window corresponding to the TV application program is located on the desktop screen. Video data is displayed in the window ("window mode"). The computer 10 can also display the video data on the display screen of the LCD 17 in a full-screen mode. In the full-screen mode, video data alone is displayed on a substantial area of the display screen.

The CPU 111 executes a system BIOS (Basic Input/Output System) that is stored in the BIOS-ROM 120. The system BIOS is a program for hardware control.

The north bridge 112 is a bridge device that connects a local bus of the CPU 111 and the south bridge 119. The north bridge 112 includes a memory controller that controls access to the main memory 113. The north bridge 112 further controls communications with the graphics controller 114 via an AGP (Accelerated Graphics Port) bus for example.

The graphics controller 114 is a display controller for controlling the LCD 17 that is used as a display monitor of the computer 10. The graphics controller 114 includes a video memory (VRAM) and generates a video signal, which forms a display image to be displayed on the LCD 17, on the basis of display data that is written in the video memory (VRAM) by the OS/application program. The graphics controller 114 also includes a first interface (CRT OUT) for outputting an analog video signal to an external CRT (Cathode-Ray Tube), and a second interface (S Video Out) for outputting an analog video signal to the outside via the S-video output connector.

The south bridge 119 controls each device on an LPC (Low Pin Count) bus. The south bridge 119 includes an IDE (Integrated Drive Electronics) controller for controlling the HDD 121 and ODD 122. The south bridge 119 also includes a function of controlling access to the BIOS-ROM 120 and a function of controlling each device on an input/output (I/O) bus 20 such as a PCI (Peripheral Component Interconnect) bus for example. The TV tuner/capture unit 123 is coupled to the I/O (e.g., PCI) bus 20.

The TV tuner/capture unit 123 is coupled to the I/O (e.g., PCI) bus 20 via a bus connector 30. The bus connector 30 comprises, e.g. a Mini PCI connector. The TV tuner/capture unit 123 is a video data receiving device that receives video data (e.g. a TV broadcast signal, or video data from an external device). The TV tuner/capture unit 123 receives video data and outputs the received video data to the I/O bus 20. In this case, the received video data is compression-encoded in the TV tuner/capture unit 123 using a compression-encoding scheme such as MPEG2 or MPEG4 (MPEG: Moving Picture Coding Experts Group), an H.264 encoding scheme and the like. The compression-encoded data is output to the I/O (e.g., PCI) bus 20. The compression-encoded data is then decoded by the TV application program and displayed on the LCD 17. In addition, the TV application program can execute a recording process for storing the compression-encoded video data, which is output from the TV tuner/capture unit 123, in the hard disk drive (HDD) 121.

The embedded controller/keyboard controller IC (EC/KBC) 124 is a single chip microcomputer in which an embedded controller for power management and a keyboard controller for controlling the keyboard (KB) 13 and touch pad 16 are integrated. The embedded controller/keyboard controller IC (EC/KBC) 124 has a function of powering on/off the computer 10 in response to the user's operation of the power button 14.

Figure 3:
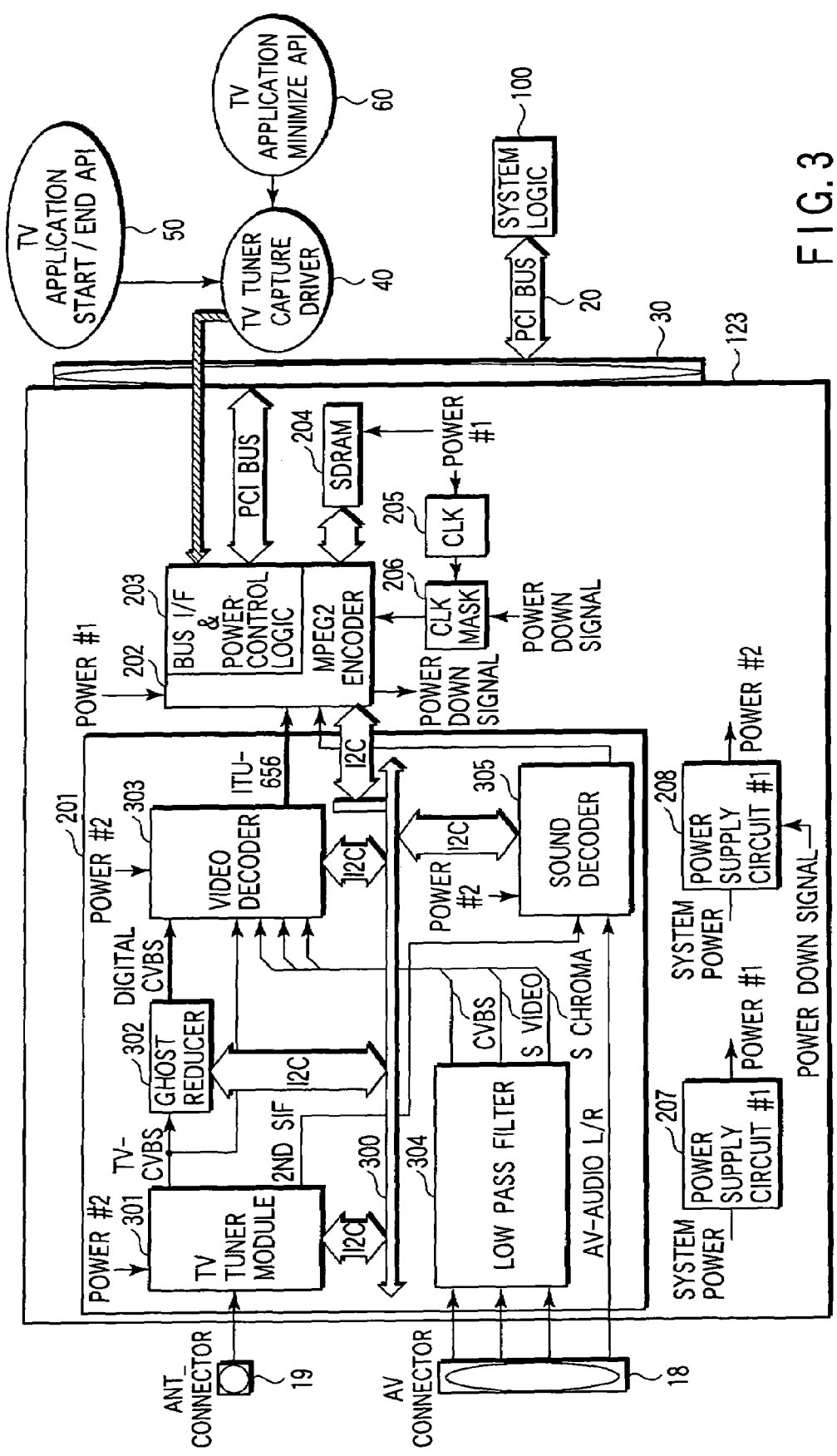
FIG. 3 is a block diagram that shows the exemplary structure of a receiving device that is provided in the computer shown in FIG. 1.

Next, referring to FIG. 3, the exemplary structure of the TV tuner/capture unit 123 is described.

The TV tuner/capture unit 123 is in communication with system logic 100 of the computer 10 via the bus connector 30 and I/O (e.g., PCI) bus 20. The system logic 100 functions as a host system of the TV tuner/capture unit 123. The system logic 100 includes the CPU 111, north bridge 112, main memory 113, graphics controller 114, south bridge 119, BIOS-ROM 120, hard disk drive (HDD) 121, optical disk drive (ODD) 122 and embedded controller/keyboard controller IC (EC/KBC) 124, which are shown in FIG. 2.

A TV tuner/capture driver 40 is a control program that controls the TV tuner/capture unit 123. The TV tuner/capture driver 40 is executed by the CPU 111.

The TV tuner/capture unit 123 includes a receiving unit 201, an audio/video (AV) encoder 202 (e.g., MPEP2 encoder), a bus interface & power control circuit 203, a synchronous DRAM (SDRAM) 204, a clock generator 205, a clock mask circuit 206, a first power supply circuit 207 and a second power supply circuit 208.

The receiving unit 201 is driven by a second power supply signal (second power #2) that is output from the second power supply circuit 208. The second power supply circuit 208 generates the second power #2 from a system power that is supplied from a power supply device within the system logic 100. The AV encoder 202, bus interface & power control circuit 203, synchronous DRAM (SDRAM) 204 and clock generator 205 are driven by a first power supply signal (first power #1) that is output from the first power supply circuit 207. The first power supply circuit 207 generates the first power #1 from the system power.

The receiving unit 201 receives video data. The receiving unit 201 is realized as a region-free TV tuner unit that is usable worldwide. The receiving unit 201 supports a plurality of TV broadcast systems (e.g. NTSC-M/M, PAL-/I, PAL-B/G, SECAM-L/L', and PAL-D/D). The receiving unit 201 includes a TV tuner module 301, a ghost reducer 302, a video decoder 303, a low-pass filter 304 and a sound decoder 305. The TV tuner module 301, ghost reducer 302, video decoder 303 and sound decoder 305 are connected to a serial bus ($I^2C$ bus) 300.

The TV tuner module 301 is coupled to the TV antenna connector 19 so as to receive a TV broadcast signal that carries video data and audio data. The TV tuner module 301 is configured to be tunable to various TV broadcast signal frequencies that are associated with the above-mentioned various TV broadcast systems. The TV tuner module 301 demodulates the received TV broadcast signal and generates, for example, video data of a composite-signal format (TV-CVBS) and audio data of a 2nd SIF format. The video data is delivered as a TV input to the video decoder 303 via the ghost reducer 302 and is directly delivered from the TV tuner module 301 to the video decoder 303 as a TV input.

The ghost reducer 302 is a circuit that executes a ghost reduction process for reducing ghost of video data that comes from the TV tuner module 301. The ghost reduction process is executed using a ghost cancel reference (GCR) signal that is included in a vertical blanking interval (VBI) of video data. The ghost reducer 302 includes a ghost cancel filter. The ghost reducer 302 detects GCR in the video data, and controls a tap coefficient of the ghost cancel filter. The Japanese NTSC system is the only TV broadcast system in which GCR is superimposed on a TV broadcast signal. Thus, only when a Japanese-system NTSC signal is received, the ghost reduction process is effectively executed.

The video decoder 303 has a TV input port for receiving video data (digital CVBS) from the ghost reducer 302, and a TV input port that directly receives video data (TV-CVBS) from the TV tuner module 301. Additionally, the video decoder 303 has three video input ports for receiving composite video data CVBS, S-video data (Y) and S-chroma data (C) via the low-pass filter 304 from the AV connector set 18.

The video decoder 303 executes video signal processes (Y/C separation process, noise reduction process, etc.) for decoding the input video data, thereby generating digital video data of, e.g. ITU-656 format. The ITU-656-format digital video data is input to the AV encoder 202.

The Y/C separation process and digital noise reduction process, like the ghost reduction process, are processes for enhancing the image quality of video data. The Y/C separation process is a process for separating a composite signal (CVBS-format video data) into a Y (luminance) signal and a C (chroma) signal. The video decoder 303 can selectively execute the following three kinds of Y/C separation process:

3-dimensional Y/C separation process,
2-dimensional (5-line) Y/C separation process, and
1-dimensional (band-pass filter BPS) Y/C separation process.

According to one embodiment of the invention, the video decoder 303 executes the optimal Y/C separation process for the TV broadcast system and input source (TV input, CVBS video input, S-video input) of the input video data. Thereby, the input video data can be reproduced and recorded with high quality. The discrimination of the TV broadcast system can be performed using publicly known art (e.g. Jpn. Pat. Appln. KOKAI Publication No. 6-335005).

The video decoder 303 can execute the following two kinds of noise reduction processes:

3-dimensional noise reduction process, and
color distortion correction process.

According to one embodiment of the invention, the video decoder 303 executes the optimal noise reduction process for the TV broadcast system and input source (TV input, CVBS video input, S-video input) of the input video data. Thereby, the input video data can be reproduced and recorded with high quality.

The sound decoder 305 executes a sound signal process for decoding sound data (audio data) that is input from the TV tuner module 301 or AV connector set 18, thereby generating digital audio data of, e.g. I2S format. The I2S-format digital audio data is sent to the AV encoder 202.

The AV encoder 202 is a PCI device. The AV encoder 202 compression-encodes ITU-656-format video data and I2S-format audio data, and generates a compression-encoded AV stream. The compression-encoding process is executed on the SDRAM 204. The compression-encoded AV stream is sent to the system logic 100 via the bus interface & power control circuit 203, bus connector 30 and I/O (e.g., PCI) bus 20.

The AV encoder 202 is equipped with the bus interface & power control circuit 203. The bus interface & power control circuit 203 includes an interface unit that is connected to the I/O (e.g., PCI) bus 20 via the bus connector 30, and a power control circuit for executing power management of the TV tuner/capture unit 123. The interface unit is adapted to communicate with the system logic 100 via the I/O (e.g., PCI) bus 20. The interface unit is provided with a plurality of registers that can be accessed by the CPU 111. The power control circuit changes the state of the TV tuner/capture unit 123 between a power-down state and an operative state in response to a power-save mode ON/OFF command that is written in the interface unit by the CPU 111. Specifically, when the interface unit receives a power-save mode ON command from the CPU 111, the power control circuit changes the state of the TV tuner/capture unit 123 from the operative state to the power-down state. On the other hand, when the interface unit receives a power-save mode OFF command from the CPU 111, the power control circuit changes the state of the TV tuner/capture unit 123 from the power-down state to the operative state.

The operative state is a state in which the TV tuner/capture unit 123 is operating. In this operative state, all components in the TV tuner/capture unit 123 are powered on. In other words, the second power #2 is supplied to the receiving unit 201, and the first power #1 is supplied to the AV encoder 202, bus interface & power control circuit 203, synchronous DRAM (SDRAM) 204 and clock generator 205.

The power-down state is an off-state with a lower power consumption than in the operative state. In the power-down state, the receiving unit 201 is powered off while the AV encoder 202 is kept in the power-on state. The reason why only the receiving unit 201 is powered off is that the AV encoder 202 is the PCI device that is directly connected to the I/O (e.g., PCI) bus 20. If the AV encoder 202 is suddenly powered off in the state in which the computer is powered on, malfunction of the system logic 100 may be caused.

The interface unit in the bus interface & power control circuit 203 may be realized as a device independent from the AV encoder 202. In this case, only the interface unit functions as the PCI device. Thus, the components in the TV tuner/capture unit 123, other than the interface unit, can be powered off.

When the power-save mode ON command is set in the register within the interface unit by the CPU 111, the power control circuit in the bus interface & power control circuit 203 sets the power-down signal in the active state. The power-down signal is delivered to the second power supply circuit 208 and clock mask circuit 206.

When the power-down signal is set in the active state, the second power supply circuit 208 stops the generation of the second power. Thus, the receiving unit 201 is powered off. When the power-down signal is set in the active state, the clock mask circuit 206 cuts off the clock signal from the clock generator 205, and prohibits the supply of the clock signal to the AV encoder 202. Accordingly, the operation of the AV encoder 202 is stopped, and the power consumption of the AV encoder 202 can be saved. While the operation of the AV encoder 202 is being in the off-state, no access to the SDRAM 204 is executed. Thus, the power consumption of the SDRAM 204 can also be saved.

Even while the operation of the AV encoder 202 is in the off-state, the bus interface & power control circuit 203 can be kept in operation. When the power-save mode OFF command is set in the register within the interface unit by the CPU 111, the power control circuit in the bus interface & power control circuit 203 sets the power-down signal in the inactive state. Thereby, the supply of the second power #2 from the second power supply circuit 208 to the receiving unit 201 is resumed. In addition, the supply of the clock signal to the AV encoder 202 is resumed.

The default state of the power-down signal is the inactive state. Thus, after the computer 10 is powered on, the TV tuner/capture unit 123 is kept in operation unless the power-down signal is set in the active state.

The power-save mode ON/OFF command is issued in accordance with the start/end of the TV application program under the control of the TV tuner/capture driver 40. Specifically, the TV tuner/capture driver 40 executes communication with the operating system through a TV application start/end API (Application Program Interface) 50, thereby detecting the start/end of the TV application program. Upon detecting the start of the TV application program, the TV tuner/capture driver 40 sets the power-save mode OFF command in the register within the bus interface & power control circuit 203. On the other hand, upon detecting the end of the TV application program, the TV tuner/capture driver 40 sets the power-save mode ON command in the register within the bus interface & power control circuit 203.

In addition, the TV tuner/capture driver 40 communicates with the operating system through a TV application minimize API 60, thereby detecting whether the size of the window of the TV application program is minimized. Upon detecting the minimization of the window size of the TV application program, the TV tuner/capture driver 40 sets the power-save mode ON command in the register within the bus interface & power control circuit 203. On the other hand, upon detecting the release of the minimization of the window size of the TV application program, that is, the restoration of the window size of the TV application program to the original size, the TV tuner/capture driver 40 sets the power-save mode OFF command in the register within the bus interface & power control circuit 203.

Next, referring to an exemplary flowchart of FIG. 4, the procedure of the power management process that is executed by the computer 10 is described.

When the computer 10 is powered on, the system logic 100 is supplied with system power and the TV tuner/capture unit 123 is also supplied with system power. Thereby, the TV tuner/capture unit 123 is set in the operative state (block S101). Specifically, in the TV tuner/capture unit 123, the first power #1 and second power #2 are turned on and all the components in the TV tuner/capture unit 123 are powered on (FULL ON state).

Under the control of the operating system, the TV tuner/capture driver 40 is loaded in the memory 113 (block S102). The TV tuner/capture driver 40 first executes a process (power-down process) for changing the state of the TV tuner/capture unit 123 from the operative state to the power-down state (block S103). Then, the TV tuner/capture driver 40 determines whether the TV application program is activated, using the TV application start/end API 50 (block S104).

If the TV application program is started (YES in block S104), the TV tuner/capture driver 40 executes the process (FULL ON process) for changing the state of the TV tuner/capture unit 123 from the power-down state to the operative state (FULL ON state) (block S105). Then, the TV tuner/capture driver 40 determines whether the TV application program is ended, using the TV application start/end API 50 (block S106).

If the TV application program is ended (YES in block S106), the TV tuner/capture driver 40 executes the process (power-down process) for changing the state of the TV tuner/capture unit 123 from the operative state to the power-down state (block S103).

As has been described above, in the present embodiment, while the TV application program is not executed, the TV tuner/capture unit 123 is kept in the power-down state. Thus, useless power consumption by the TV tuner/capture unit 123 can be reduced.

Figure 5:
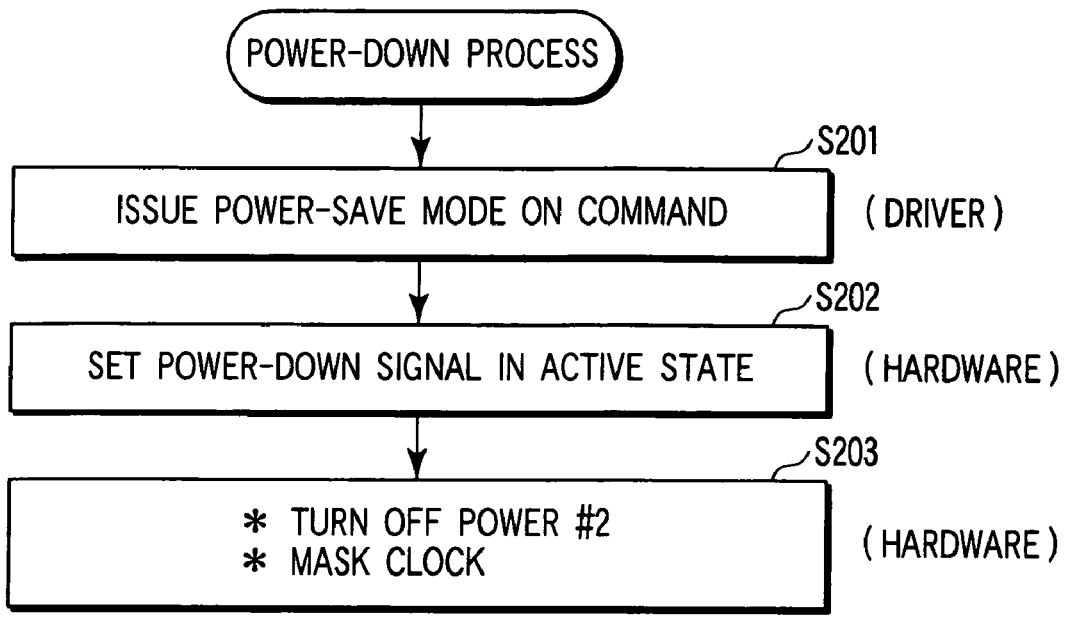
FIG. 5 is a flowchart that illustrates an example of the procedure of a power-down process that is executed by the computer shown in FIG. 1.

Next, referring to an exemplary flowchart of FIG. 5, the procedure of the power-down process, which is executed in block S103 in FIG. 4, is described.

The TV tuner/capture driver 40 issues a power-save ON command and sets the power-save ON command in the register within the bus interface & power control circuit 203 via the I/O (e.g., PCI) bus 20 (block S201). The bus interface & power control circuit 203 turns on the power-down signal and generates the active-state power-down signal (block S202). Responding to the generation of the active-state power-down signal, the second power supply circuit 208 turns off the second power, and the clock mask circuit 206 cuts off the clock signal that is output from the clock generator 205, and prohibits the clock signal from being supplied to the AV encoder 202 (block S203). Thereby, the TV tuner/capture unit 123 is set in the power-down state, that is, in the low-power-consumption state.

Figure 6:
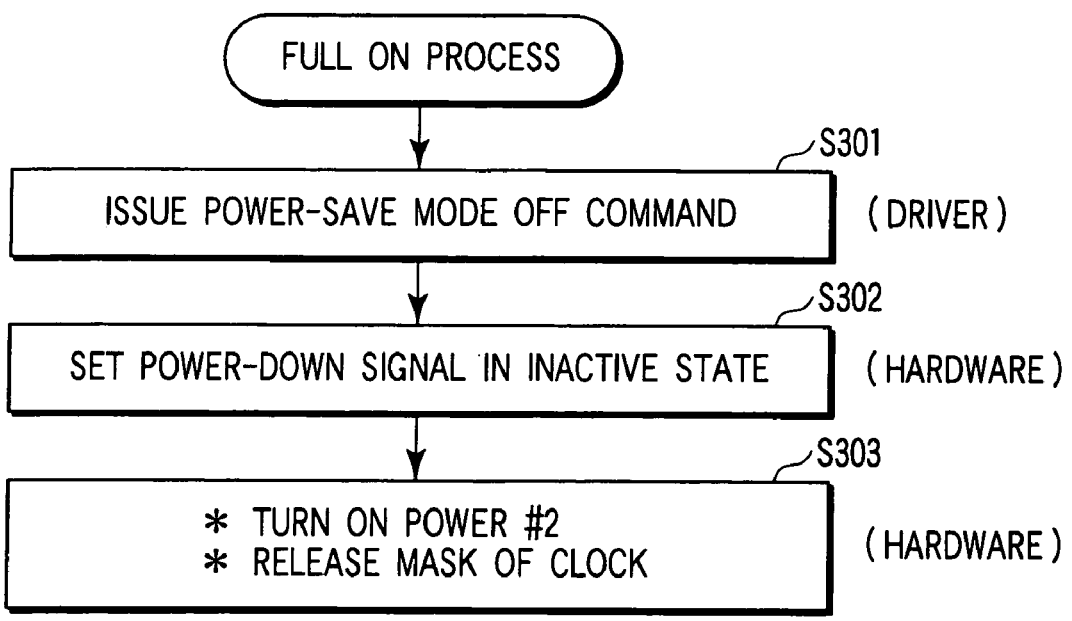
FIG. 6 is a flowchart that illustrates an example of the procedure of a FULL ON process that is executed by the computer shown in FIG. 1.

Next, referring to an exemplary flowchart of FIG. 6, the FULL ON process that is executed in block S105 in FIG. 4 is described.

The TV tuner/capture driver 40 issues a power-save OFF command and sets the power-save OFF command in the register within the bus interface & power control circuit 203 via the I/O (e.g., PCI) bus 20 (block S301). The bus interface & power control circuit 203 turns off the power-down signal and stops the generation of the active-state power-down signal (block S302). Responding to the stop of generation of the power-down signal, the second power supply circuit 208 turns on the second power and the clock mask circuit 206 releases the mask of the clock signal that is output from the clock generator 205, thereby permitting the supply of the clock signal to the AV encoder 202 (block S303). Thus, the state of the TV tuner/capture unit 123 is restored to the operative state.

Figure 7:
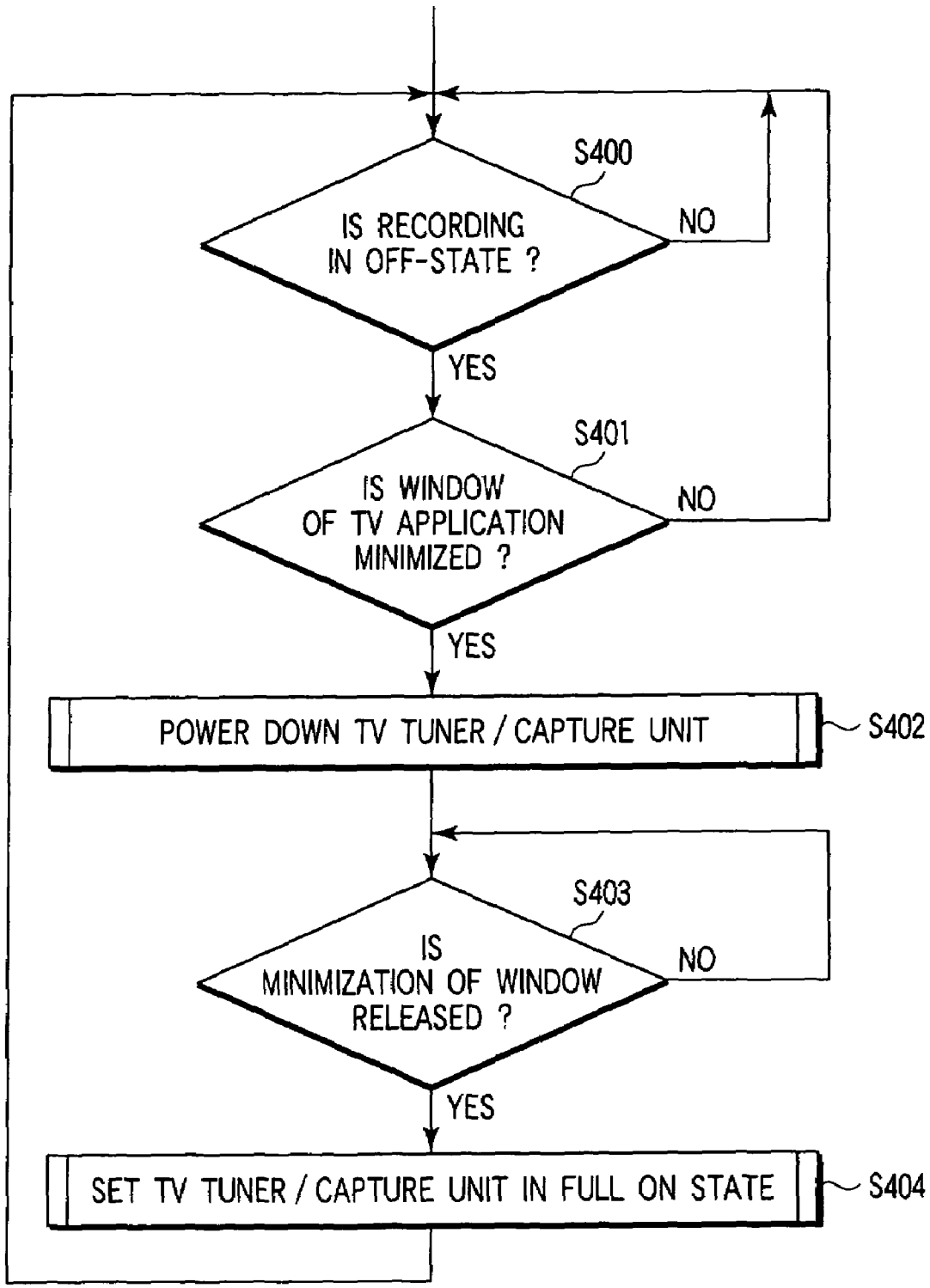
FIG. 7 is a flowchart illustrating an exemplary power-down process that is executed when the window of a TV application program is minimized in the computer shown in FIG. 1.

Next, referring to an exemplary flowchart of FIG. 7, a description is given of the process for setting the TV tuner/capture unit 123 in the power-down state in response to minimization of the window corresponding to the TV application program.

While the TV application program is being activated, that is, while the TV application program is running, the TV tuner/capture driver 40 executes the following process.

The TV tuner/capture driver 40 detects whether video data that is received by the TV tuner/capture driver 40 is not being recorded (block S400). If the video data is not being recorded, that is, if the video data that is received by the TV tuner/capture driver 40 is not currently being recorded (YES in block S400), the TV tuner/capture driver 40 detects whether the window corresponding to the TV application program is minimized (block S401). If the window of the TV application program is minimized in the non-recording state (YES in block S401), the TV tuner/capture driver 40 executes the process (power-down process) for changing the state of the TV tuner/capture unit 123 from the operative state to the power-down state (block S402). Then, the TV tuner/capture driver 40 detects whether the minimization of the window of the TV application program is released, that is, whether the window corresponding to the TV application program is restored to the original size (block S403). If the window of the TV application program is restored to the original size (YES in block S403), the TV tuner/capture driver 40 executes the process (FULL ON process) for changing the state of the TV tuner/capture unit 123 from the power-down state to the operative state (FULL ON state) (block S404).

As has been described above, in the present embodiment, the power management of the TV tuner/capture unit 123 is executed in accordance with the start/end of the TV application program and the window size of the TV application program. Therefore, while the video data that is received by the TV tuner/capture unit 123 is not being used, the TV tuner/capture unit 123 can be set in the power-down state, and useless power consumption by the TV tuner/capture 123 can be reduced.

In the power-down state, the receiving unit 201, which includes the TV tuner module 301, ghost reducer 302, video decoder 303 and sound decoder 305, is powered off. Therefore, the power consumption by the TV tuner/capture unit 123 can be reduced to a minimum.

Even in the power-down state, the interface unit that is connected to the I/O (e.g., PCI) bus 20 is not powered off. Thus, malfunction of the system logic 100 is not caused. Furthermore, in the power-down state, too, the interface unit can normally receive the command (power-down mode OFF command) from the CPU 111.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
    a receiving unit to receive video data;
    a driver configured to detect a start and an end of a video reproduction program that reproduces the video data received by the receiving unit; and
    a control circuit in communication with the driver, the control circuit configured to change a state of the receiving unit from a power-down state to an operative state when the start of the video reproduction program is detected, and to change the state of the receiving unit from the operative state to the power-down state when the end of the video reproduction program is detected.

2. The information processing apparatus according to claim 1, wherein the receiving unit further comprises an interface unit coupled to a bus, the control circuit configured to power off the receiving unit when the interface unit is powered on, thereby changing the state of the receiving unit from the operative state to the power-down state.

3. The information processing apparatus according to claim 2, wherein the receiving unit includes a tuner unit that receives a broadcast signal carrying the video data, a video signal processing unit that decodes the video data included in the broadcast signal received by the tuner unit, and a sound signal processing unit that decodes sound data included in the broadcast signal received by the tuner unit.

4. The information processing apparatus according to claim 2, wherein the control circuit is a bus interface and a power control circuit implemented with an audio/video (AV) encoder.

5. The information processing apparatus according to claim 4 further comprising a first power supply circuit coupled to the receiving unit, the first power supply circuit placing the receiving unit into the power-down state by discontinuing a supply of power to the receiving unit in response to a power down signal from the bus interface and the power control circuit.

6. The information processing apparatus according to claim 5 further comprising a second power supply circuit to supply power to the bus interface and the power control circuit of the AV encoder.

7. The information processing apparatus according to claim 5 further comprising a clock mask circuit to provide a clock signal to the AV encoder, the clock mask circuit to prohibit a supply of the clock signal to the AV encoder to halt operations of the AV encoder in response to the power down signal from the bus interface and the power control circuit while the bus interface and the power control circuit continues operations.

8. The information processing apparatus according to claim 1, further comprising a display device including a screen to display the video data received by the receiving unit within a window produced by the video reproduction program,
    the driver configured to detect whether a size of the window is minimized, and
    the control circuit configured to change the state of the receiving unit from the operative state to the power-down state when it is detected that the size of the window is minimized.

9. An information processing apparatus comprising:
    a bus;
    a processor coupled to the bus, the processor to execute a video reproduction program for reproducing video data, and a control program for transmitting a first command and a second command in response to a start and an end of the video reproduction program; and
    a TV tuner/capture unit coupled to the bus, the TV tuner/capture unit including a receiving unit to receive the video data and a power supply control unit configured to power off the receiving unit upon receipt of the second command, and to power on the receiving unit upon receipt of the first command.

10. The information processing apparatus according to claim 9, wherein the receiving unit of the TV tuner/capture unit includes a tuner unit that receives a broadcast signal carrying the video data, a video signal processing unit that decodes the video data included in the broadcast signal received by the tuner unit, and a sound signal processing unit that decodes sound data included in the broadcast signal received by the tuner unit.

11. The information processing apparatus according to claim 9, wherein the power supply control unit of the TV tuner/capture unit is a bus interface and power control circuit implemented with an audio-video (AV) encoder.

12. The information processing apparatus according to claim 11, wherein the TV tuner/capture unit further comprises a first power supply circuit coupled to the receiving unit, the first power supply circuit powers off the receiving unit by discontinuing a supply of power to the receiving unit in response to the second command from the bus interface and power control circuit.

13. The information processing apparatus according to claim 12, wherein the TV tuner/capture unit further comprises a second power supply circuit to provide power to the bus interface and the power control circuit of the AV encoder.

14. The information processing apparatus according to claim 11, wherein the TV tuner/capture unit further comprises a clock mask circuit to provide a clock signal to the AV encoder, the clock mask circuit to prohibit a supply of the clock signal to the AV encoder to halt operations of the AV encoder in response to receipt of the second command from the bus interface and the power control circuit while the bus interface and the power control circuit continues operations.

15. The information processing apparatus according to claim 9, further comprising a display device including a screen to display the video data received by the receiving unit within a window produced by the video reproduction program, and
    the control program transmits the second command to the receiving unit in response to minimization of a size of the window.

16. A method for controlling power consumption by an information processing apparatus, the method comprising:

detecting a start and an end of a video reproduction program adapted to reproduce video data received by the information processing apparatus;

changing a state of at least one device within the information processing apparatus from a power-down state to an operative state when the start of the video reproduction program is detected; and changing the state of the at least one device from the operative state to the power-down state when the end of the video reproduction program is detected.

17. The method according to claim 16, wherein the device comprises a receiving unit that receives the video data, the receiving unit includes a tuner module, a video decoder and a sound encoder being placed into a power-down state when the end of the video reproduction program is detected.

18. The method according to claim 17, wherein the device further comprises an audio-video (AV) encoder including a power control circuit, the power control circuit remaining powered while the AV encoder is prevented from receiving a clocking signal to temporarily halt operations of the AV encoder.

19. The method according to claim 18, wherein the detecting the start and the end of the video reproduction program comprises a driver setting a register within the power control circuit.

* * * * *